(12) United States Patent
Breslau et al.

(10) Patent No.: US 8,223,451 B2
(45) Date of Patent: Jul. 17, 2012

(54) DATA STORAGE APPARATUS AND METHOD

(75) Inventors: Franklin Charles Breslau, Teaneck, NJ (US); Ori Pomerantz, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 12/370,672

(22) Filed: Feb. 13, 2009

(65) Prior Publication Data
US 2010/0208383 A1  Aug. 19, 2010

(51) Int. Cl.
*G11B 5/00* (2006.01)
(52) U.S. Cl. ...... 360/75; 369/44.19; 360/64; 360/241.1; 360/281
(58) Field of Classification Search ............ 369/44.19; 360/75, 241.1, 241.2, 63, 64, 266.2, 270, 360/281, 246.6
See application file for complete search history.

(56) References Cited

U.S. PATENT DOCUMENTS

| | | | |
|---|---|---|---|
| 5,343,345 A | | 8/1994 | Gilovich |
| 5,610,808 A * | | 3/1997 | Squires et al. ............ 700/2 |
| 5,729,408 A * | | 3/1998 | Kikitsu ............ 360/294.7 |
| 5,901,019 A | | 5/1999 | Bucska et al. |
| 5,983,485 A | | 11/1999 | Misso |
| 6,121,742 A | | 9/2000 | Misso |
| 6,496,326 B1 * | | 12/2002 | Boutaghou ............ 360/97.03 |
| 6,775,080 B2 * | | 8/2004 | King et al. ............ 360/48 |
| 6,895,500 B1 * | | 5/2005 | Rothberg ............ 713/1 |
| 7,102,842 B1 | | 9/2006 | Howard |
| 7,324,301 B2 | | 1/2008 | Tormasi |
| 2002/0057512 A1 * | | 5/2002 | Chung et al. ............ 360/67 |
| 2005/0207067 A1 * | | 9/2005 | Zabtcioglu ............ 360/266.2 |
| 2006/0182005 A1 * | | 8/2006 | Oakley ............ 369/272.1 |
| 2008/0144208 A1 | | 6/2008 | Ward et al. |
| 2009/0296536 A1 * | | 12/2009 | Nagai ............ 369/13.24 |

OTHER PUBLICATIONS

IBM TDB; IPCOM000013223D; High Performance Disk Drive With Non-Redundant Dual Actuators; Original Publication Date Apr. 1, 2000; IP.com Electronic Publication Jun. 18, 2003; 3 pages.

* cited by examiner

*Primary Examiner* — Thomas Alunkal
(74) *Attorney, Agent, or Firm* — Schmeiser, Olsen & Watts; Anna Linne (57) ABSTRACT

A data storage apparatus and method. The apparatus comprises a mounting structure, a motor mechanically attached to mounting structure, and a data storage platter mechanically attached to the motor. The apparatus additionally comprises a single actuator arm comprising a first and second read/write data head or multiple radial movement mechanisms each comprising a read/write data head. The single actuator arm is configured to move axially along an arc and across a top surface of the data storage platter such that the first read/write data head has access to a first section and a second section of the data storage platter and the second read/write data head only has access to the second section of data storage platter. Each radial movement mechanism moves a different read/write data head radially all along a radius of the data storage platter and over and across different sections of the data storage platter.

20 Claims, 8 Drawing Sheets

DATA STORAGE APPARATUS AND METHOD

FIELD OF THE INVENTION

The present invention relates to a method and associated system for accessing various sections of a data storage apparatus.

BACKGROUND OF THE INVENTION

Retrieving information from a device typically comprises a complicated and inefficient process with little flexibility. A user requesting information may not have the ability to quickly locate the information. Accordingly, there exists a need in the art to overcome at least some of the deficiencies and limitations described herein above.

SUMMARY OF THE INVENTION

The present invention provides a data storage apparatus comprising:
a mounting structure;
a first motor mechanically attached to said mounting structure;
a data storage platter mechanically attached to said first motor, wherein said data storage platter comprises a data storage portion and a spindle portion, wherein said spindle portion is mechanically attached to a spindle of said first motor, wherein said first motor is configured to rotate said data storage platter, wherein said data storage platter comprises a circular shape, wherein said data storage portion is located within a top surface of said data storage platter, wherein said data storage portion comprises data sections, and wherein said spindle portion is located within a center of a rotation portion of said data storage platter;
an actuator motor mechanically attached to said mounting structure;
a single actuator arm mechanically attached to said actuator motor, wherein said single actuator arm is configured to move axially along an arc and across said top surface of said data storage platter, wherein said single actuator arm comprises a first read/write data head and a second read/write data head, wherein said first read/write data head is located on said single actuator arm such that said first read/write data head has access to a first section and a second section of said data sections, wherein said second section differs from said first section, and wherein said second read/write data head is located on said single actuator arm such that said second read/write data head has access to only said second section; and
a control circuit controlling communications to said first read/write data head and said second read/write data head.

The present invention provides a data storage apparatus comprising:
a mounting structure;
a first motor mechanically attached to said mounting structure;
a data storage platter mechanically attached to said first motor, wherein said data storage platter comprises a data storage portion and a spindle portion, wherein said spindle portion is mechanically attached to a spindle of said first motor, wherein said first motor is configured to rotate said data storage platter, wherein said data storage platter comprises a circular shape, wherein said data storage portion is located within a top surface of said data storage platter, wherein said data storage portion comprises data sections, and wherein said spindle portion is located within a center of a rotation portion of said data storage platter;
a first radial movement mechanism located over said top surface of said data storage platter and mechanically attached to said mounting structure, wherein said first radial movement mechanism comprises a first actuator motor and a first movement assembly;
a first read/write data head mechanically attached to said first radial movement mechanism, wherein said first radial movement mechanism moves said first read/write data head radially along a radius of said data storage platter and across said top surface of said data storage platter such that said first read/write data head has access to only a first section of said data sections;
a second radial movement mechanism located over said top surface of said data storage platter and mechanically attached to said mounting structure, wherein said second radial movement mechanism comprises a second actuator motor and a second movement assembly;
a second read/write data head mechanically attached to said second radial movement mechanism, wherein said second radial movement mechanism moves said second read/write data head radially along said radius of said data storage platter and over and across said top surface of said data storage platter such that said second read/write data head has access to only a second section of said data sections, and wherein said second section differs from said first section; and
a control circuit controlling communications to said first read/write data head and said second read/write data head.

The present invention provides a data access method comprising:
providing a data storage apparatus comprising a mounting structure, a first motor mechanically attached to said mounting structure, a data storage platter mechanically attached to said first motor, an actuator motor mechanically attached to said mounting structure, a single actuator arm mechanically attached to said actuator motor, and a control circuit, wherein said wherein said data storage platter comprises a data storage portion and a spindle portion, wherein said spindle portion is mechanically attached to a spindle of said first motor, wherein said data storage portion comprises data within a top surface of data storage platter, wherein said data storage portion comprises sections within said top surface, wherein said spindle portion is located within a center of a rotation portion of said data storage platter, wherein said single actuator aim comprises a first read/write data head and a second read/write data head, wherein said first read/write data head is located on said single actuator arm such that said first read/write data head has access to a first section and a second section of said data sections, wherein said second section differs from said first section, and wherein said second read/write data head is located on said single actuator arm such that said second read/write data head has access to only said second section;
rotating, by said first motor, said data storage platter;
moving axially, by said actuator motor, said single actuator arm along an arc and across said top surface of said data storage platter;
accessing, by said first read/write data head in response to said moving axially, said first section and said second section;
accessing, by said second read/write data head in response to said moving axially, only said second section; and
controlling, by said control circuit, communications to said first read/write data head and said second read/write data head.

The present invention provides a data access method comprising:

providing a data storage apparatus comprising a mounting structure, a first motor mechanically attached to said mounting structure, a data storage platter mechanically attached to said first motor, a first radial movement mechanism, a first read/write data head mechanically attached to said first radial movement mechanism, a second radial movement mechanism, a second read/write data head mechanically attached to said second radial movement mechanism and a control circuit, wherein said wherein said data storage platter comprises a data storage portion and a spindle portion, wherein said spindle portion is mechanically attached to a spindle of said first motor, wherein said data storage portion comprises data within a top surface of data storage platter, wherein said data storage portion comprises sections within said top surface, and wherein said spindle portion is located within a center of a rotation portion of said data storage platter;

rotating, by said first motor, said data storage platter;

first moving radially, by said first radial movement mechanism, said first read/write data head along a radius of said data storage platter and across said top surface of said data storage platter;

accessing, by said first read/write data head in response to said first moving radially, only a first section of said data sections;

second moving radially, by said second radial movement mechanism, said second read/write data head along said radius of said data storage platter and across said top surface of said data storage platter;

accessing, by said second read/write data head in response to said second moving radially, only a second section of said data sections, wherein said second section differs from said first section; and controlling, by said control circuit, communications to said first read/write data head and said second read/write data head.

The present invention advantageously provides a simple method and associated system capable of retrieving information from a device.

DETAILED DESCRIPTION OF THE INVENTION

Figure 1:
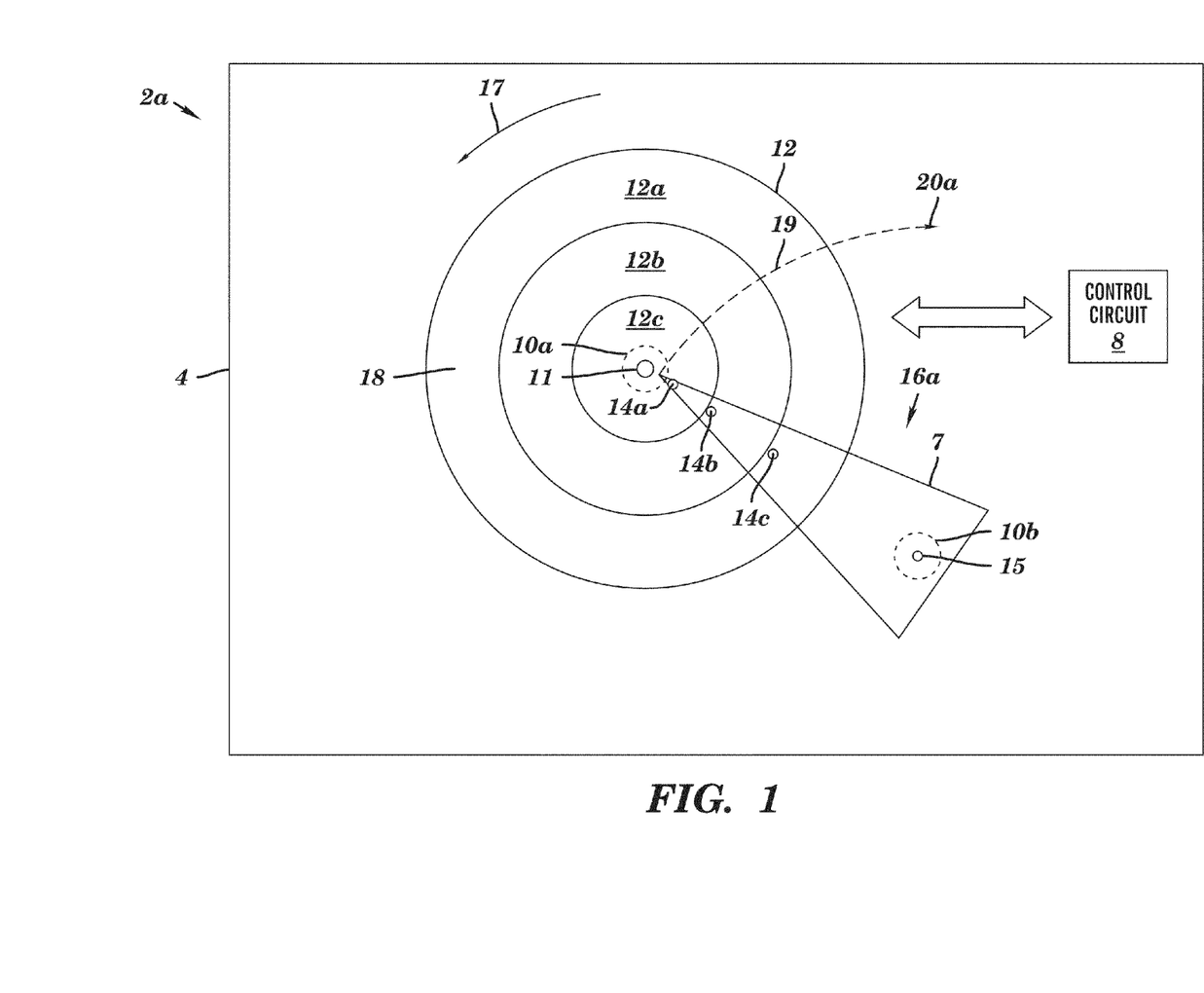
FIG. 1 illustrates a top view of a first data storage apparatus, in accordance with embodiments of the present invention.

FIG. 1 illustrates a top view of a data storage apparatus 2a, in accordance with embodiments of the present invention. Data storage apparatus 2a may comprise any type of data storage apparatus including, inter alia, a magnetic data storage apparatus (e.g., a hard disc drive), an optical data storage apparatus (e.g., a compact disc (CD) drive, a digital video disc (DVD) drive, etc), etc. Data storage apparatus 2a may be connected to a computing system for receiving and transmitting data to and from data storage apparatus 2a. Data storage apparatus 2a comprises a mounting structure 4, a motor 10a mechanically attached to the mounting structure 4, a data storage platter 12 mechanically attached to motor 10a, an actuator motor 10b mechanically attached to mounting structure 4, a single actuator arm 7 mechanically attached to actuator motor 10b, read/write (R/W) data heads 14a, 14b, and 14c mechanically attached to single actuator arm 7, and a control circuit 8 electrically connected to motors 10a and 10b and R/W data heads 14a, 14b, and 14c. Although control circuit 8 is internal to data storage apparatus 2a in FIG. 1, note that control circuit 8 could be place external to data storage apparatus 2a. Actuator motor 10b, single actuator arm 7, and read/write (R/W) data heads 14a, 14b, and 14c are comprised by an axial movement mechanism 16a. Control circuit 8 controls a movement of motors 10a and 10b and communications to and from R/W data heads 14a, 14b, and 14c. Data storage platter 12 may comprise, inter alia, a magnetic disc data storage platter, an optical disc data storage platter, etc. R/W data heads 14a, 14b, and 14c may comprise, inter alia, magnetic R/W data heads, optical R/W data heads, etc. R/W data heads 14a, 14b, and 14c perform a process for writing data to and reading data from data storage platter 12. In order to maximize efficiency and read or write data quickly, R/W data heads 14a, 14b, and 14c have access to different sections 12a, 12b, and 12c of a data storage portion of data storage platter 12. Each of sections 12a, 12b, and 12c may comprise a plurality of tracks each comprising a different portion of data. Data storage platter 12 comprises a data storage portion (i.e., comprising sections 12a, 12b, and 12c) for storing data and a spindle portion 11 attached to motor 10a.

In order to perform a process reading and writing data to and from data storage platter 12, motor 10a spins (i.e., in response to a command from control circuit 8) data storage platter 12 in a direction 17. While data storage platter 12 spins in direction 17, actuator motor 10b moves single actuator arm 7 axially along arc 19 in a direction 20a. Single actuator arm 7 pivots around pivot point 15. Single actuator arm 7 is moved over and across a top surface 18 of data storage platter 12. R/W data head 14a is located on single actuator arm 7 such that R/W data head 14a has access to sections 12a 12b, and 12c of data storage platter 12 (i.e., depending on a position of single actuator arm 7). R/W data head 14b is located on single actuator arm 7 such that R/W data head 14b has access to sections 12a and 12b (but not section 12c) of data storage platter 12 (i.e., depending on a position of single actuator arm 7). R/W data head 14c is located on single actuator arm 7 such that R/W data head 14c has access to section 12a (but not sections 12b and 12c) of data storage platter 12 (i.e., depending on a position of single actuator arm 7). The aforementioned configuration of R/W data heads 14a, 14b, and 14c allow for an efficient read/write process to be performed with respect to reading data from and writing data to data storage platter 12. For example, all of R/W data heads 14a . . . 14c could be used to read data from section 12a, but R/W data head 14c could be used to read data from section 12a of data platter 12 either with minimal movement or without moving single actuator arm 7 at all. Therefore, it is quicker to use R/W data head 14c to read data from section 12a than it is to use R/W data heads 14a or 14b. Additionally, all of R/W data heads 14a . . . 14c could read data from or write data to data storage platter 12 simultaneously thereby increasing a reading or writing data process over using a single R/W data head. Control circuit 8 controls all communications and data transfer between R/W heads 14a . . . 14c and a destination or source for the data (e.g., a computer). Control circuit 8 may systematically enable and disable communications to and from R/W data heads 14a . . . 14c depending on which of R/W data heads 14a . . . 14c is currently being used. Additionally, control circuit 8 may systematically enable and disable communications to and from R/W data heads 14a . . . 14c depending on which of R/W data heads 14a . . . 14c is able to access a selected section of data platter 12 in a fastest time. An algorithm may be executed by control circuit 8 for selecting one of R/W data heads 14a . . . 14c that will reach a destination on data storage platter 12 in a fastest time (i.e., as compared to the other R/W data heads). The algorithm may calculate an angle or distance of movement in direction 20a for single actuator arm 7 such that each of R/W data heads 14a . . . 14c may reach a specified section (e.g., of sections 12a . . . 12c) or tracks within sections 12a . . . 12c. The algorithm may select one of R/W data heads 14a . . . 14c that comprises a smallest angle or distance of movement in direction 20a. The following steps illustrate an algorithm for selecting either R/W data head 14a or R/W data head 14b (R/W head 14c is not used in the following example) for reading or writing data:

1. Calculate an angle at which single actuator arm 7 must move in direction 20a so that R/W data head 14a may reach each track on data platter 12.
2. Calculate an angle at which single actuator arm 7 must move in direction 20a so that R/W data head 14b may reach each track on data platter 12.
3. Generate table 1 as follows:

TABLE 1

| Track Number | Angle (in degrees) for R/W data head 14a | Angle (in degrees) for R/W data head 14b |
| --- | --- | --- |
| 0 | 0 | |
| 1 | 2.8125 | |
| 2 | 5.625 | |
| 3 | 8.4375 | |
| 4 | 11.25 | |
| 5 | 14.0625 | |
| 6 | 16.875 | |
| 7 | 19.6875 | |
| 8 | 22.5 | 0 |
| 9 | 25.3125 | 5.625 |
| 10 | 28.125 | 11.25 |
| 11 | 30.9375 | 16.875 |
| 12 | 33.75 | 22.5 |
| 13 | 36.5625 | 28.125 |
| 14 | 39.375 | 33.75 |
| 15 | 42.1875 | 39.375 |
| 16 | 45 | 45 |

4. Generate table 2 (i.e., from table 1) to create a table to angles and the tracks that are accessible by each associated angle.

TABLE 2

| Angle | Track available for R/W data head 14a | Track available for R/W data head 14b |
| --- | --- | --- |
| 0 | 0 | 8 |
| 2.8125 | 1 | |
| 5.625 | 2 | 9 |
| 8.4375 | 3 | |
| 11.25 | 4 | 10 |
| 14.0625 | 5 | |
| 16.875 | 6 | 11 |
| 19.6875 | 7 | |
| 22.5 | 8 | 12 |
| 25.3125 | 9 | |
| 28.125 | 10 | 13 |
| 30.9375 | 11 | |
| 33.75 | 12 | 14 |
| 36.5625 | 13 | |
| 39.375 | 14 | 15 |
| 42.1875 | 15 | |
| 45 | 16 | 16 |

5. When a computer requests information in a specific track, use table 1 to identify which of R/W data heads 14a or 14b may reach the specific track faster. For example, if the current angle of single actuator arm 7 is 8.4375 and the track requested is number 10, the fastest way to reach the specific track (i.e., track 10) would be to use R/W data head 14b which only requires an angle of movement of 2.8125.
6. When the computer requests information that resides in multiple tracks, use table 2 to identify a path that covers all the required tracks and has the least movement for single actuator arm 7. For example, if information is requested from tracks 3, 4, 5, 10, and 11, the following path illustrated in table 3 is used:

TABLE 3

| Angle | Track | R/W data head |
| --- | --- | --- |
| 8.4375 | 3 | 14a |
| 11.25 | 4 | 14a |
| 11.25 | 10 | 14b |
| 14.0625 | 5 | 14a |
| 16.875 | 11 | 14b |

Figure 2:
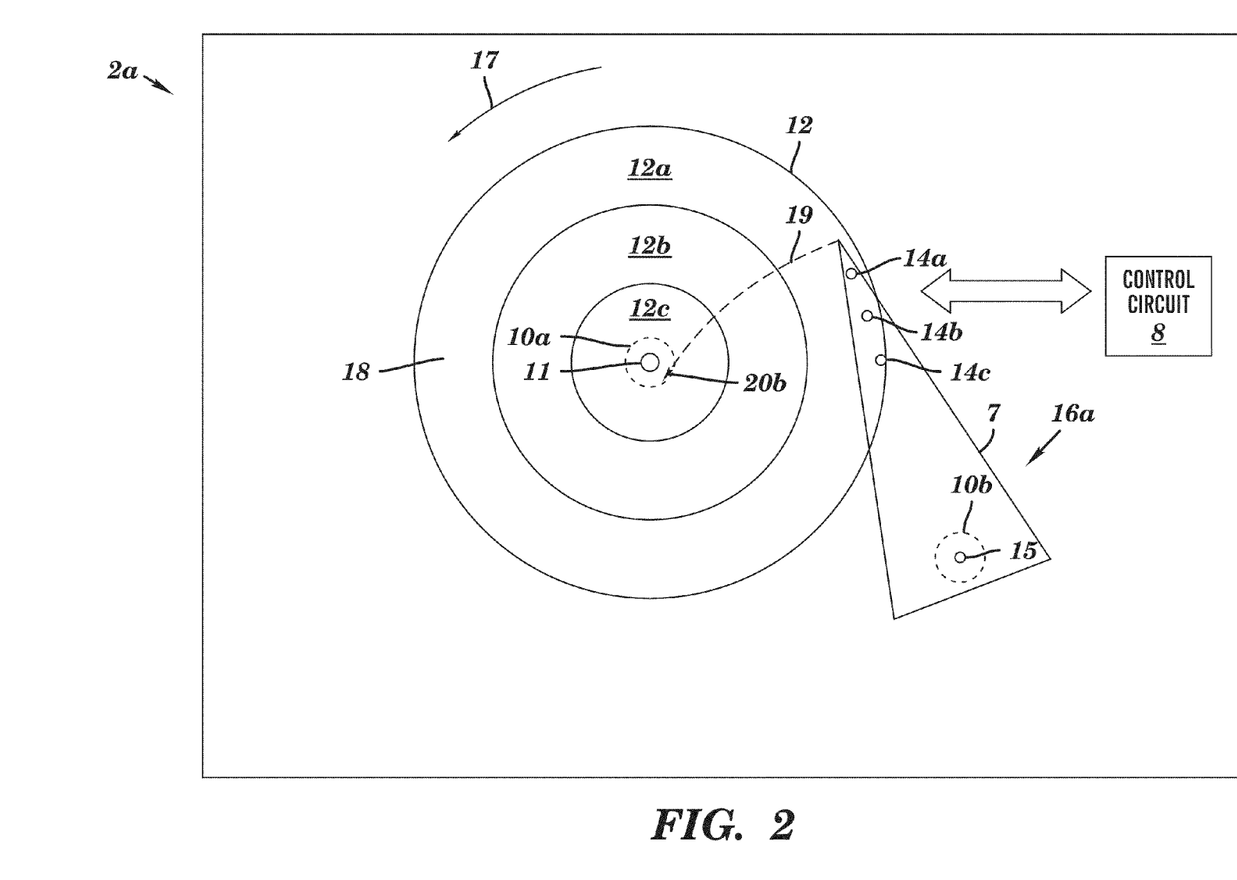
FIG. 2 illustrates an alternate top view of the first data storage apparatus of FIG. 1, in accordance with embodiments of the present invention.

FIG. 2 illustrates a top view of data storage apparatus 2a of FIG. 1 after single actuator arm 7 has traveled a specified distance over arc 19 and in direction 20a, in accordance with embodiments of the present invention. Additionally, single actuator arm 7 may travel the specified distance in over arc 19 in direction 20b to reach a point illustrated in FIG. 1.

Figure 3:
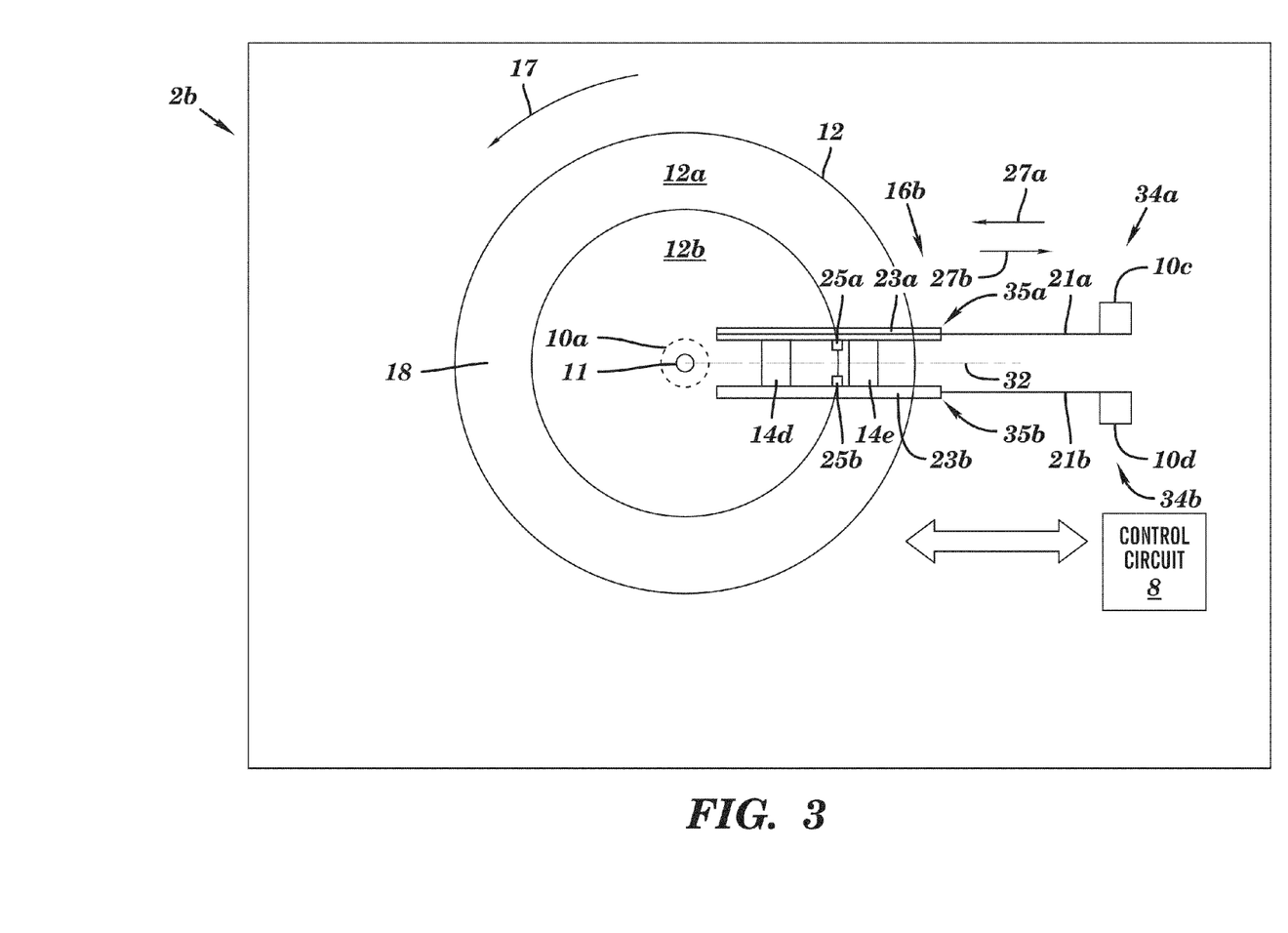
FIG. 3 illustrates a top view of a second data storage apparatus, in accordance with embodiments of the present invention.

FIG. 3 illustrates a top view of an alternative data storage apparatus 2b to data storage apparatus 2a of FIG. 1, in accordance with embodiments of the present invention. In contrast with data storage apparatus 2a of FIG. 1, data storage apparatus 2b of FIG. 2 comprises a radial movement assembly 16b replacing axial movement mechanism 16a. Radial movement assembly 16b comprises a radial movement mechanism 34a, a radial movement mechanism 34b, R/W data head 14d mechanically attached to radial movement mechanism 34a, and R/W data head 14e mechanically attached to radial movement mechanism 34b. Radial movement mechanism 34a comprises an actuator motor 10c and a movement assembly 35a. Radial movement mechanism 34b comprises an actuator motor 10d and a movement assembly 35b. Movement assembly 35a comprises a rail 23a, a stopper 25a, and a rigid strip 21a. Rigid strip 21a is mechanically attached to R/W data head 14d and actuator motor 10c such that actuator motor 10c moves R/W data head 14d along radius 32. R/W data head 14*d* is guided by rail 23*a*. Movement assembly 35*b* comprises a rail 23*b*, a stopper 25*b*, and a rigid strip 21*b*. Rigid strip 21*b* is mechanically attached to R/W data head 14*e* and actuator motor 10*d* such that actuator motor 10*d* moves R/W data head 14*e* along radius 32. R/W data head 14*e* is guided by rail 23*b*.

In order to perform a process for reading and writing data to and from data storage platter 12, motor 10*a* spins (i.e., in response to a command from control circuit 8) data storage platter 12 in direction 17. While data storage platter 12 spins in direction 17:

1. Radial movement mechanism 34*a* moves R/W data head 14*d* radially in direction 27*a* or 27*b*, along radius 32 of data storage platter 12, and across top surface 18 of data storage platter 12 such that R/W data head 14*d* has access to only section 12*b* of data storage platter 12. Stopper 25*a* and stopper 25*b* prevent (i.e., block) R/W data head 14*d* from reaching section 12*a* of data platter 12.
2. Radial movement mechanism 34*b* moves R/W data head 14*e* radially in direction 27*a* or 27*b*, along radius 32 of data storage platter 12, and across top surface 18 of data storage platter 12 such that R/W data head 14*e* has access to only section 12*a* of data storage platter 12. Stopper 25*a* and stopper 25*b* prevent (i.e., block) R/W data head 14*e* from reaching section 12*b* of data platter 12.

The aforementioned configuration of R/W data heads 14*d* and 14*e* allow for an efficient read/write process to be performed with respect to reading data from and writing data to data storage platter 12. For example, R/W data head 14*d* is dedicated to reading data from section 12*b* and R/W data head 14*e* is dedicated to reading data from section 12*a* of data platter 12 thereby reducing a time to reach tracks in each of sections 12*a* and 12*b*. Additionally, all R/W data heads 14*d* and 14*e* could read data from or write data to data storage platter 12 simultaneously thereby increasing a reading or writing data process over using a single R/W data head. Control circuit 8 controls all communications and data transfer between R/W heads 14*d* or 14*e* and a destination or source for the data (e.g., a computer). Control circuit 8 may systematically enable and disable communications to and from R/W data heads 14*d* and 14*e* depending on which of R/W data heads 14*d* and 14*e* is currently being used. An algorithm may be executed by control circuit 8 for selecting one of R/W data heads 14*d* or 14*e* depending on a section of data platter 12 that is selected.

Figure 4:
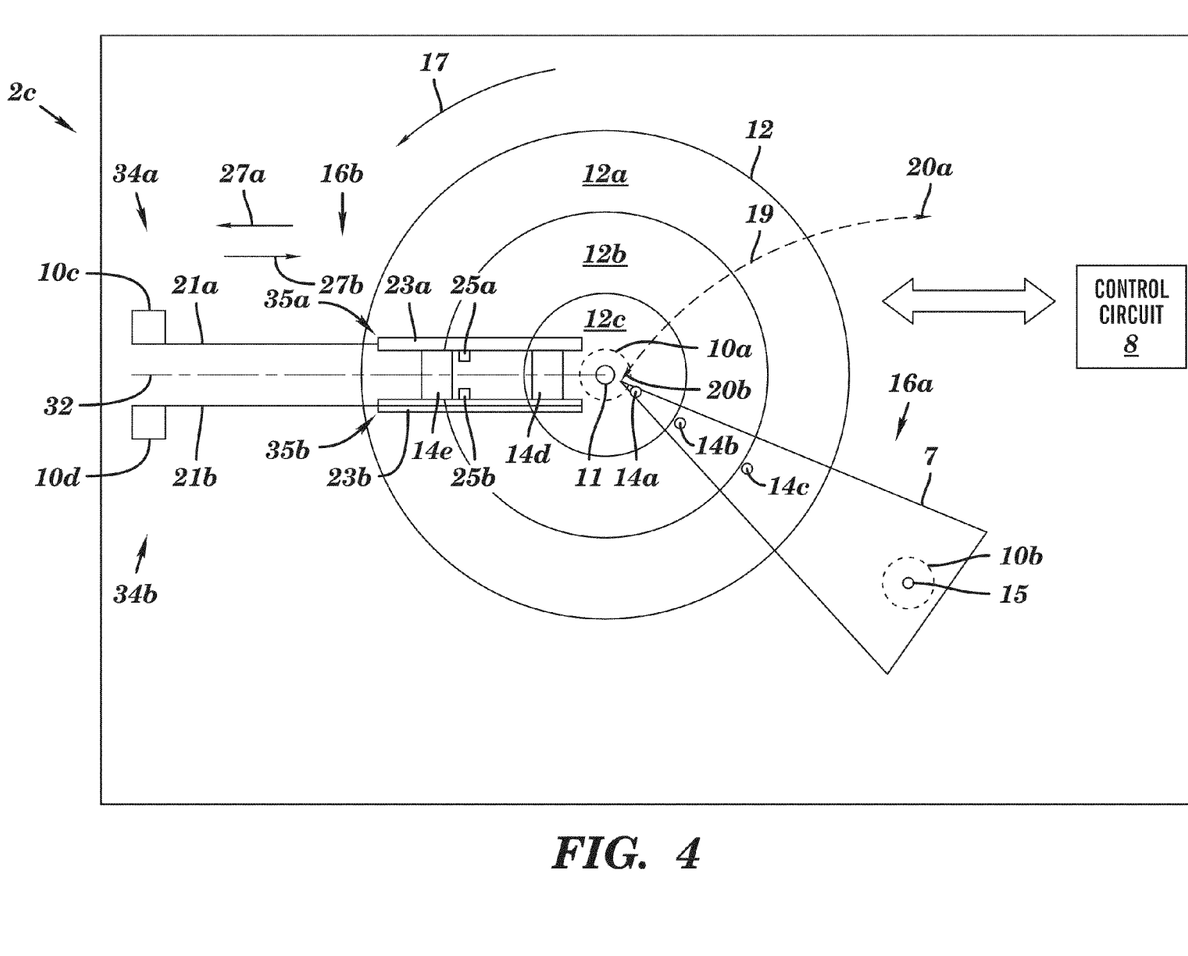
FIG. 4 illustrates a top view of a third data storage apparatus, in accordance with embodiments of the present invention.

FIG. 4 illustrates a top view of a data storage apparatus 2*c*, in accordance with embodiments of the present invention. Data storage apparatus 2*c* comprises a combination of data storage apparatus 2*a* of FIGS. 1 and 2 and data storage apparatus 2*b* of FIG. 3. Data storage apparatus 2*c* allows for an efficient read/write process to be performed with respect to reading data from and writing data to data storage platter 12. For example, R/W data heads 14*a* . . . 14*e* could read data from or write data to data storage platter 12 simultaneously thereby increasing a reading or writing data process over using a single R/W data head. Control circuit 8 controls all communications and data transfer between R/W heads 14*a* . . . 14*e* and a destination or source for the data (e.g., a computer). Control circuit 8 may systematically enable and disable communications to and from R/W data heads 14*a* . . . 14*e* depending on which of R/W data heads 14*a* . . . 14*e* are currently being used. An algorithm may be executed by control circuit 8 for selecting one of R/W data heads 14*a* . . . 14*e* depending on a section(s) of data platter 12 that is selected.

Figure 5:
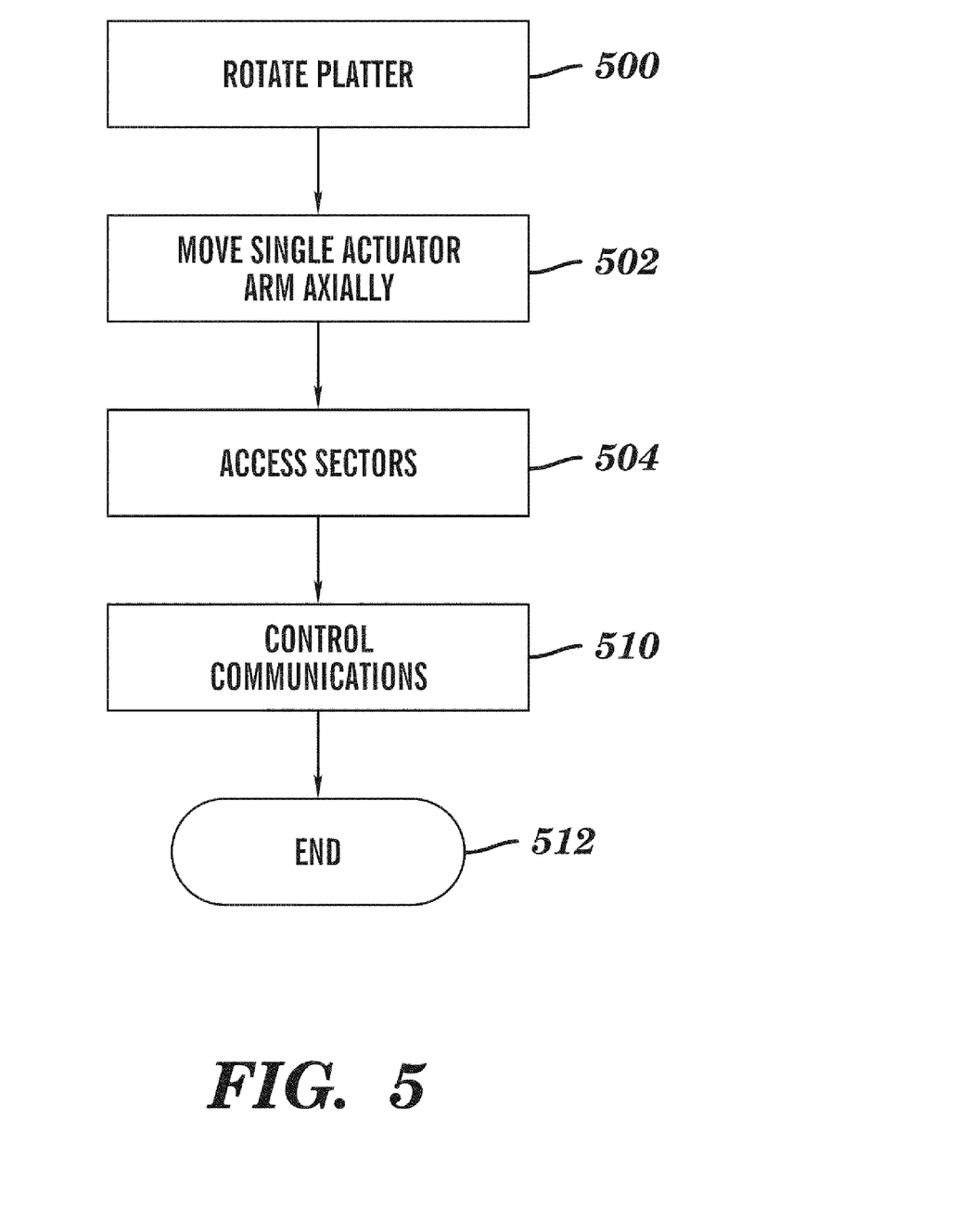
FIG. 5 illustrates a flowchart describing an algorithm used by the first data storage apparatus of FIG. 1 for executing a process for reading and writing data to and from a data storage platter, in accordance with embodiments of the present invention.

FIG. 5 illustrates a flowchart describing an algorithm used by data storage apparatus 2*a* of FIG. 1 for executing a process for reading and writing data to and from data storage platter 12, in accordance with embodiments of the present invention.

In step 500, data storage platter 12 is rotated. In step 502, single actuator arm 7 is moved axially (i.e., by actuator motor 10*b*) along arc 19 and across top surface 18 of data storage platter 12. In step 504, R/W data head 14*a* (i.e., in response to step 502) accesses sections 12*a* 12*b*, and 12*c* of data storage platter 12 (i.e., depending on a position of single actuator arm 7), R/W data head 14*b* accesses to sections 12*a* and 12*b* (i.e., but not section 12*c*) of data storage platter 12 (i.e., depending on a position of single actuator arm 7), and R/W data head 14*c* accesses section 12*a* (i.e., but not sections and 12*b* and 12*c*) of data storage platter 12 (i.e., depending on a position of single actuator arm 7). In step 510, control circuit 8 controls all communications and data transfer between R/W heads 14*a* . . . 14*c* and a destination or source for the data (e.g., a computer). Control circuit 8 may systematically enable and disable communications to and from R/W data heads 14*a* . . . 14*c* depending on which of R/W data heads 14*a* . . . 14*c* is currently being used. Additionally, control circuit 8 may systematically enable and disable communications to and from R/W data heads 14*a* . . . 14*c* depending on which of R/W data heads 14*a* . . . 14*c* is able to access a selected section of data platter 12 in a fastest time. In step 512 the process is terminated.

Figure 6:
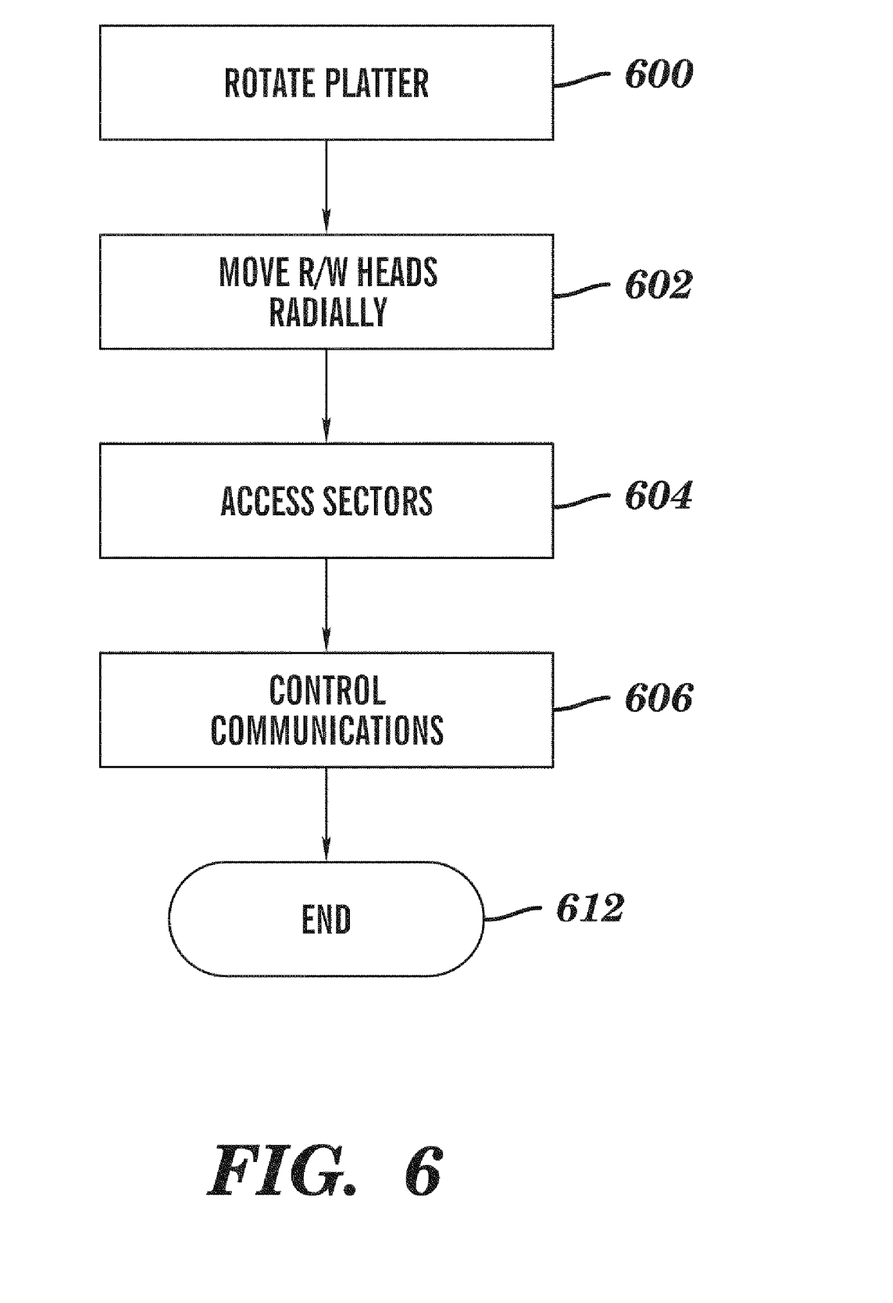
FIG. 6 illustrates a flowchart describing an algorithm used by the second data storage apparatus of FIG. 3 for executing a process for reading and writing data to and from a data storage platter, in accordance with embodiments of the present invention.

FIG. 6 illustrates a flowchart describing an algorithm used by data storage apparatus 2*b* of FIG. 3 for executing a process for reading and writing data to and from data storage platter 12, in accordance with embodiments of the present invention. In step 600, data storage platter 12 is rotated. In step 602, R/W data head 14*d* is moved radially (i.e., by radial movement mechanism 35*a*) in direction 27*a* or 27*b* along radius 32 of data storage platter 12 and across top surface 18 of data storage platter 12. Additionally, R/W data head 14*e* is moved radially (i.e., by radial movement mechanism 35*a*) in direction 27*a* or 27*b* along radius 32 of data storage platter 12 and across top surface 18 of data storage platter 12. In step 604, R/W data head 14*d* accesses only section 12*b* of data storage platter 12. Stopper 25*a* and stopper 25*b* prevent (i.e., block) R/W data head 14*d* from reaching section 12*a* of data platter 12. Additionally, R/W data head 14*e* accesses only section 12*a* of data storage platter 12. Stopper 25*a* and stopper 25*b* prevent (i.e., block) R/W data head 14*e* from reaching section 12*b* of data platter 12. In step 606, control circuit 8 controls all communications and data transfer between R/W heads 14*d* or 14*e* and a destination or source for the data (e.g., a computer). Control circuit 8 may systematically enable and disable communications to and from R/W data heads 14*d* and 14*e* depending on which of R/W data heads 14*d* and 14*e* is currently being used. An algorithm may be executed by control circuit 8 for selecting one of R/W data heads 14*d* or 14*e* depending on a section of data platter 12 that is selected. In step 612 the process is terminated.

Figure 7:
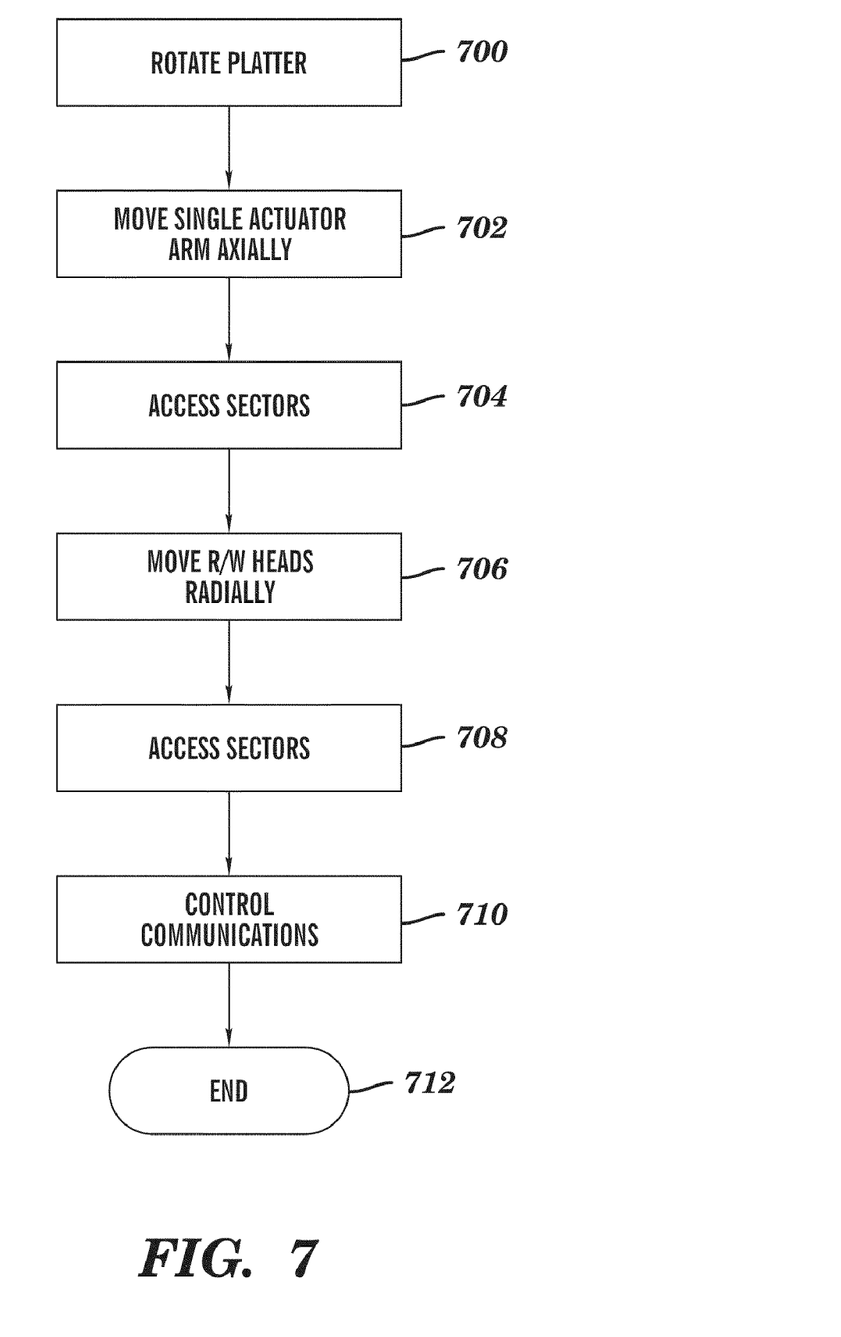
FIG. 7 illustrates a flowchart describing an algorithm used by the third data storage apparatus of FIG. 4 for executing a process for reading and writing data to and from a data storage platter, in accordance with embodiments of the present invention.

FIG. 7 illustrates a flowchart describing an algorithm used by data storage apparatus 2*c* of FIG. 4 for executing a process for reading and writing data to and from data storage platter 12, in accordance with embodiments of the present invention. In step 700, data storage platter 12 is rotated. In step 702, single actuator arm 7 is moved axially (i.e., by actuator motor 10*b*) along arc 19 and across top surface 18 of data storage platter 12. In step 704, R/W data head 14*a* (i.e., in response to step 702) accesses sections 12*a* 12*b*, and 12*c* of data storage platter 12 (i.e., depending on a position of single actuator arm 7), R/W data head 14*b* accesses to sections 12*a* and 12*b* (but not section 12*c*) of data storage platter 12 (i.e., depending on a position of single actuator arm 7), and R/W data head 14*c* accesses section 12*a* (but not sections and 12*b* and 12*c*) of data storage platter 12 (i.e., depending on a position of single actuator arm 7). In step 706, R/W data head 14*d* is moved radially (i.e., by radial movement mechanism 35*a*) in direction 27*a* or 27*b* along radius 32 of data storage platter 12 and across top surface 18 of data storage platter 12. Additionally, R/W data head 14*e* is moved radially (i.e., by radial movement mechanism 35*a*) in direction 27*a* or 27*b* along radius 32 of data storage platter 12 and across top surface 18 of data storage platter 12. In step 708, R/W data head 14*d* accesses only section 12*b* of data storage platter 12. Stopper 25*a* and stopper 25*b* prevent (i.e., block) R/W data head 14*d* from reaching section 12*a* of data platter 12. Additionally, R/W data head 14*e* accesses only section 12*a* of data storage platter 12. Stopper 25*a* and stopper 25*b* prevent (i.e., block) R/W data head 14*e* from reaching section 12*b* of data platter 12. In step 710, control circuit 8 controls all communications and data transfer between R/W heads 14*a* . . . 14*e* and a destination or source for the data (e.g., a computer). Control circuit 8 may systematically enable and disable communications to and from R/W data heads 14*a* . . . 14*e* depending on which of R/W data heads 14*a* . . . 14*e* are currently being used. An algorithm may be executed by control circuit 8 for selecting one of R/W data heads 14*a* . . . 14*e* depending on a section(s) of data platter 12 that is selected. In step 712 the process is terminated.

Figure 8:
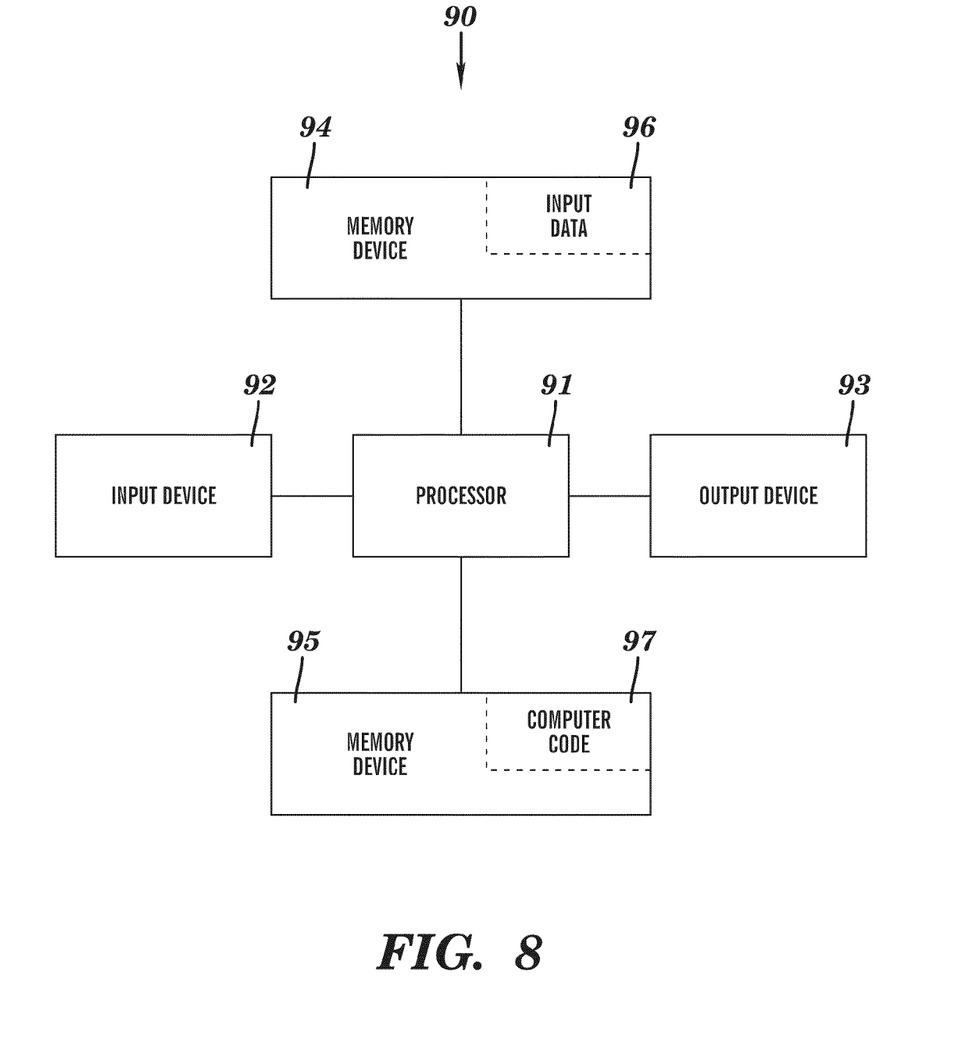
FIG. 8 illustrates a computer apparatus used for executing a process for reading and writing data to and from a data storage platter, in accordance with embodiments of the present invention.

FIG. 8 illustrates a computer apparatus 90 (e.g., control circuit 8 of FIG. 1) used for executing a process for reading and writing data to and from a data storage platter, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 5-7) for executing a process for reading and writing data to and from a data storage platter. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may comprise the algorithms of FIGS. 5-7 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to execute a process for reading and writing data to and from a data storage platter. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for executing a process for reading and writing data to and from a data storage platter. In another embodiment, the invention provides a business method that performs the process steps of the invention on a subscription, advertising, and/or fee basis. That is, a service provider, such as a Solution Integrator, could offer to execute a process for reading and writing data to and from a data storage platter. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A data storage apparatus comprising:
   a mounting structure;
   a first motor mechanically attached to said mounting structure;
   a data storage platter mechanically attached to said first motor, wherein said data storage platter comprises a data storage portion and a spindle portion, wherein said spindle portion is mechanically attached to a spindle of said first motor, wherein said first motor is configured to rotate said data storage platter, wherein said data storage platter comprises a circular shape, wherein said data storage portion is located within a top surface of said data storage platter, wherein said data storage portion comprises data sections, and wherein said spindle portion is located within a center of a rotation portion of said data storage platter;
   an actuator motor mechanically attached to said mounting structure;
   a single actuator arm mechanically attached to said actuator motor, wherein said single actuator arm is configured to move axially along an arc and across said top surface of said data storage platter, wherein said single actuator arm comprises a first read/write data head and a second read/write data head, wherein said first read/write data head is located on said single actuator arm such that said first read/write data head has access to a first section and a second section of said data sections, wherein said second section differs from said first section, and wherein said second read/write data head is located on said single actuator arm such that said second read/write data head has access to only said second section; and
   a control circuit controlling communications to said first read/write data head and said second read/write data head, wherein the control circuit is configured to selectively enable or disable communications to said first read/write data head and said second read/write data head in response to detecting which of said first read/ write data head or said second read/write data head is currently configured to read data from said data storage platter or write data to said data storage platter, and wherein the control circuit is further configured to selectively enable or disable communications to said first read/write data head or said second read/write data head in response to calculating a time indicating which of said first read/write data head or said second read/write data head will reach a specified destination on said data storage platter first.

2. The data storage apparatus of claim 1, wherein said control circuit enables communications to said second read/write data head, and wherein said control circuit disables communications to said first read/write data head.

3. The data storage apparatus of claim 1, wherein said single actuator arm further comprises a third read/write data head, wherein said third read/write data head is located on said single actuator arm such that said third read/write data head has access to only a third section and said second section of said data sections, and wherein said first read/write data head has further access to said third section.

4. The data storage apparatus of claim 1, wherein said data storage platter comprises a magnetic data storage medium, and wherein said first read/write data head and said second read/write data head each comprise a magnetic read/write data head.

5. The data storage apparatus of claim 1, wherein said data storage platter comprises an optical data storage medium, and wherein said first read/write data head and said second read/write data head each comprise an optical read/write data head.

6. The data storage apparatus of claim 1, further comprising:
a radial movement mechanism located over said top surface of said data storage platter and mechanically attached to said mounting structure; and
a third read/write data head mechanically attached to said radial movement mechanism, wherein said radial movement mechanism moves said third read/write data head radially along a radius of said data storage platter and across said top surface of said data storage platter such that said third read/write data head has access to said first section and said second section, and wherein said control circuit further controls communications to said third read/write data head.

7. The data storage apparatus of claim 1, wherein said first read/write data head and said second read/write data head are formed coaxially on a single axis extending through a pivot point for said single actuator arm.

8. A data storage apparatus comprising:
a mounting structure;
a first motor mechanically attached to said mounting structure;
a data storage platter mechanically attached to said first motor, wherein said data storage platter comprises a data storage portion and a spindle portion, wherein said spindle portion is mechanically attached to a spindle of said first motor, wherein said first motor is configured to rotate said data storage platter, wherein said data storage platter comprises a circular shape, wherein said data storage portion is located within a top surface of said data storage platter, wherein said data storage portion comprises data sections, and wherein said spindle portion is located within a center of a rotation portion of said data storage platter;
a first radial movement mechanism located over said top surface of said data storage platter and mechanically attached to said mounting structure, wherein said first radial movement mechanism comprises a first actuator motor and a first movement assembly;
a first read/write data head and a first stopper mechanically attached to said first radial movement mechanism, wherein said first radial movement mechanism moves said first read/write data head radially along a radius of said data storage platter and across said top surface of said data storage platter such that said first stopper allows said first read/write data head to access only a first section of said data sections;
a second radial movement mechanism located over said top surface of said data storage platter and mechanically attached to said mounting structure, wherein said second radial movement mechanism comprises a second actuator motor and a second movement assembly, wherein said second actuator motor is independent and differs from said first actuator motor, and wherein said second movement assembly is independent and differs from said first actuator movement assembly;
a second read/write data head and a second stopper mechanically attached to said second radial movement mechanism, wherein said second radial movement mechanism moves said second read/write data head radially along said radius of said data storage platter and over and across said top surface of said data storage platter such that said second stopper allows said second read/write data head to access only a second section of said data sections, wherein said second section differs from said first section, wherein said second radial movement mechanism moves said second read/write data head independently from said first read/write data head, and wherein said first radial movement mechanism moves said first read/write data head independently from said second read/write data head; and
a control circuit controlling communications to said first read/write data head and said second read/write data head, wherein the control circuit is configured to selectively enable or disable communications to said first read/write data head and said second read/write data head in response to detecting which of said first read/write data head or said second read/write data head is currently configured to read data from said data storage platter or write data to said data storage platter.

9. The data storage apparatus of claim 8, wherein said control circuit enables communications to said second read/write data head, and wherein said control circuit disables communications to said first read/write data head.

10. The data storage apparatus of claim 8, wherein said control circuit enables communications to said first read/write data head and said second read/write data head.

11. The data storage apparatus of claim 8, wherein said data storage platter comprises a magnetic data storage medium, and wherein said first read/write data head and said second read/write data head each comprise a magnetic read/write data head.

12. The data storage apparatus of claim 8, wherein said data storage platter comprises an optical data storage medium, and wherein said first read/write data head and said second read/write data head each comprise an optical read/write data head.

13. The data storage apparatus of claim 8, further comprising:
a single actuator arm mechanically attached to an actuator motor, wherein said single actuator arm moves axially along an arc and across said top surface of said data storage platter, wherein said single actuator arm comprises a third read/write data head, wherein said third read/write data head is located on said single actuator arm such that said third read/write data head has access to said first section and said second section, and wherein said control circuit controls communications to said third read/write data head.

14. A data access method comprising:
providing a data storage apparatus comprising a mounting structure, a first motor mechanically attached to said mounting structure, a data storage platter mechanically attached to said first motor, an actuator motor mechanically attached to said mounting structure, a single actuator arm mechanically attached to said actuator motor, and a control circuit, wherein said wherein said data storage platter comprises a data storage portion and a spindle portion, wherein said spindle portion is mechanically attached to a spindle of said first motor, wherein said data storage portion comprises data within a top surface of data storage platter, wherein said data storage portion comprises sections within said top surface, wherein said spindle portion is located within a center of a rotation portion of said data storage platter, wherein said single actuator arm comprises a first read/write data head and a second read/write data head, wherein said first read/write data head is located on said single actuator arm such that said first read/write data head has access to a first section and a second section of said data sections, wherein said second section differs from said first section, and wherein said second read/write data head is located on said single actuator arm such that said second read/write data head has access to only said second section;
rotating, by said first motor, said data storage platter;
moving axially, by said actuator motor, said single actuator arm along an arc and across said top surface of said data storage platter;
accessing, by said first read/write data head in response to said moving axially, said first section and said second section;
accessing, by said second read/write data head in response to said moving axially, only said second section; and
controlling, by said control circuit, communications to said first read/write data head and said second read/write data head, wherein controlling comprises:
selectively enabling or disabling communications to said first read/write data head and said second read/write data head in response to detecting which of said first read/write data head or said second read/write data head is currently configured to read data from said data storage platter or write data to said data storage platter; and
selectively enabling or disabling communications to said first read/write data head or said second read/write data head in response to calculating a time indicating which of said first read/write data head or said second read/write data head will reach a specified destination on said data storage platter first.

15. The method of claim 14, wherein said single actuator arm further comprises a third read/write data head, wherein said third read/write data head is located on said single actuator arm such that said third read/write data head has access to only a third section and said second section of said data sections,
accessing, by said third read/write data head in response to said moving axially, said third section and said second section; and
controlling, by said control circuit, communications to said third read/write data head.

16. The method of claim 14, wherein said data storage apparatus further comprises a radial movement mechanism located over said top surface of said data storage platter and mechanically attached to said mounting structure, wherein said radial movement mechanism comprises a third read/write data head mechanically attached to said radial movement mechanism, and wherein said method further comprises:
moving radially, by said radial movement mechanism, said third read/write data head along a radius of said data storage platter and across said top surface of said data storage platter;
accessing, by said third read/write data head in response to said moving radially, said first section and said second section; and
controlling, by said control circuit, communications to said third read/write data head.

17. A data access method comprising:
providing a data storage apparatus comprising a mounting structure, a first motor mechanically attached to said mounting structure, a data storage platter mechanically attached to said first motor, a first radial movement mechanism, a second radial movement mechanism, and a control circuit, wherein said first radial movement mechanism comprises a first actuator motor, a first read/write data head, and a first stopper mechanically attached to said first radial movement mechanism, wherein said second radial movement mechanism comprises a second actuator motor, a second read/write data head, and a second stopper mechanically attached to said second radial movement mechanism, wherein said second actuator motor is independent and differs from said first actuator motor, wherein said wherein said data storage platter comprises a data storage portion and a spindle portion, wherein said spindle portion is mechanically attached to a spindle of said first motor, wherein said data storage portion comprises data within a top surface of data storage platter, wherein said data storage portion comprises sections within said top surface, and wherein said spindle portion is located within a center of a rotation portion of said data storage platter;
rotating, by said first motor, said data storage platter;
first moving radially, by said first radial movement mechanism, said first read/write data head along a radius of said data storage platter and across said top surface of said data storage platter;
accessing, by said first read/write data head in response to said first moving radially and said first stopper, only a first section of said data sections;
second moving radially, by said second radial movement mechanism, said second read/write data head along said radius of said data storage platter and across said top surface of said data storage platter, wherein said second moving radially moves said second read/write data head independently from said first moving radially, and wherein said first moving radially moves said first read/write data head independently from said second moving radially;
accessing, by said second read/write data head in response to said second moving radially and said second stopper, only a second section of said data sections, wherein said second section differs from said first section; and
controlling, by said control circuit, communications to said first read/write data head and said second read/write data head, wherein controlling comprises:
selectively enabling or disabling communications to said first read/write data head and said second read/ write data head in response to detecting which of said first read/write data head or said second read/write data head is currently configured to read data from said data storage platter or write data to said data storage platter; and selectively enabling or disabling communications to said first read/write data head or said second read/write data head in response to calculating a time indicating which of said first read/write data head or said second read/write data head will reach a specified destination on data storage platter first.

18. The method of claim 17, wherein said data storage platter comprises a magnetic data storage medium, and wherein said first read/write data head and said second read/write data head each comprise a magnetic read/write data head.

19. The method of claim 17, wherein said data storage platter comprises an optical data storage medium, and wherein said first read/write data head and said second read/write data head each comprise an optical read/write data head.

20. The method of claim 17, wherein said data storage apparatus further comprises a single actuator arm mechanically attached to an actuator motor and a third read/write data head mechanically attached to said single actuator arm, and wherein said method further comprises:

moving axially, by said single actuator arm, said third read/write data head along an arc and across said top surface of said data storage platter;

accessing, by said third read/write data head in response to said moving axially, said first section and said second section; and controlling, by said control circuit, communications to said third read/write data head.

* * * * *